April 18, 1967     P. K. SHRECK ETAL     3,314,165
EDUCATIONAL DEVICE
Filed July 6, 1964     2 Sheets-Sheet 1
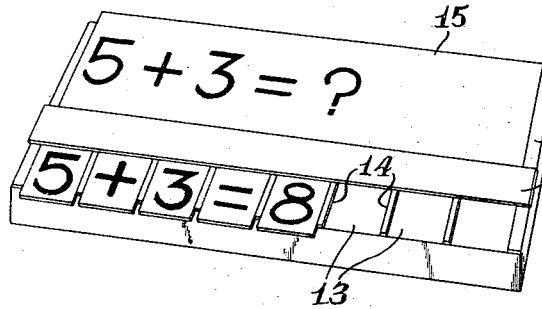
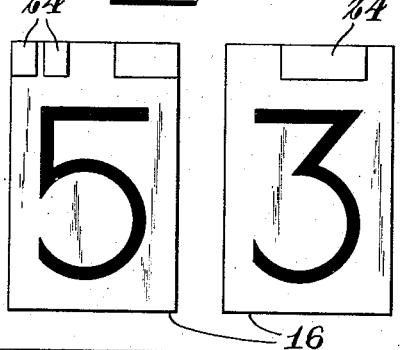
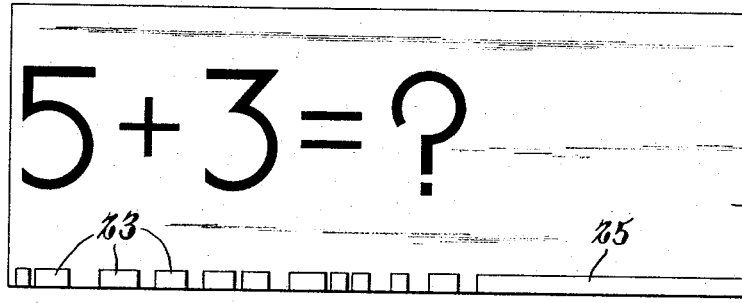
INVENTORS
PETER K. SHRECK
THOMAS B. HOWE
BY *Blair, Freeman & Molinare*
                     Attys.

April 18, 1967 P. K. SHRECK ETAL 3,314,165
EDUCATIONAL DEVICE
Filed July 6, 1964 2 Sheets-Sheet 2
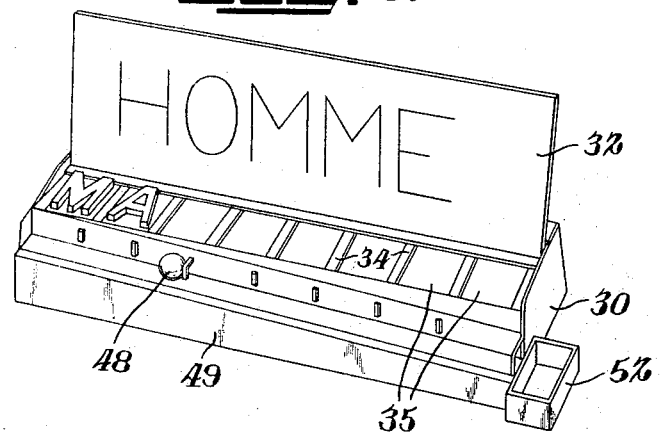
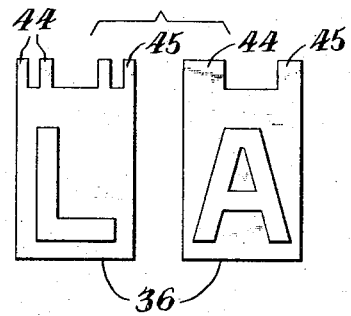
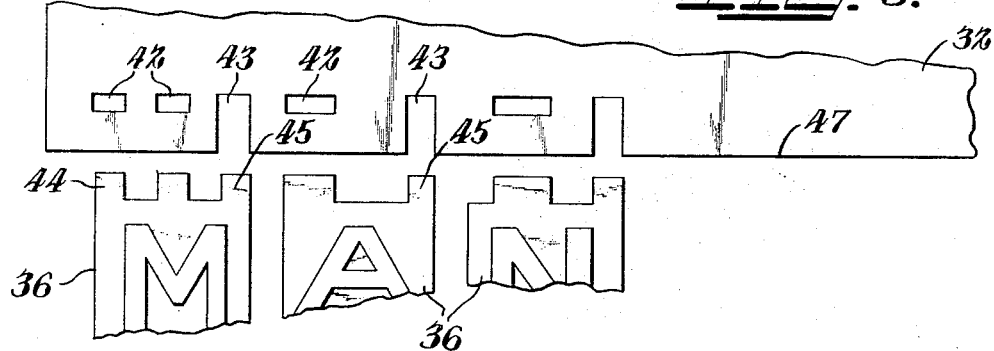
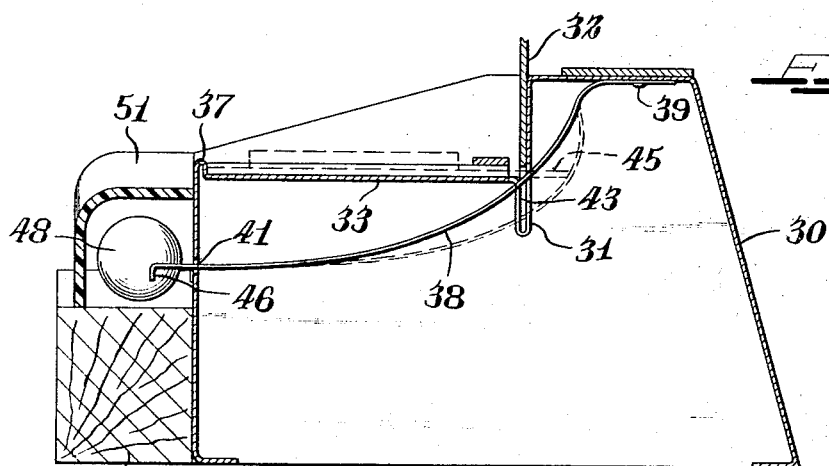
INVENTORS
PETER K. SHRECK
THOMAS B. HOWE
BY
*Attys.*

United States Patent Office 3,314,165
Patented Apr. 18, 1967

3,314,165
EDUCATIONAL DEVICE
Peter K. Shreck, 555 Cornelia Ave., Chicago, Ill. 60657, and Thomas B. Howe, 26 Oswego Drive, Greenlawn, N.Y. 11740
Filed July 6, 1964, Ser. No. 380,255
9 Claims. (Cl. 35—8)

This invention relates to educational devices and more particularly to devices for indicating the correct solution to problems of substantially any character.

Educational devices have heretofore been proposed in which a problem is stated on a master card and is answered by inserting individual character cards in spaces provided therefor. When the problem is correctly answered by placement of the individual character cards, an indicating or signalling device is actuated to indicate the correct solution. Devices of this general type can be used for teaching various subjects, including arithmetic, language, foreign language translation, object identification and the like, as well as for entertainment purposes.

In such prior devices it has been necessary that all of the character cards required for answering a problem be placed before the signal functions. This sometimes tends to be discouraging, especially to younger children, since there is no indication that any portion of the answer is correct before the answer is completed. It is also necessary with these prior devices when character cards are not required in all of the spaces for the answer to a problem that blank character cards be placed in the unused spaces before the signal operates. Thus the user is not informed promptly that he has correctly answered the problem even when this is the case.

It is accordingly an object of the present invention to provide an educational device which overcomes these deficiences of prior devices and which indicates progressively when the correct character cards are placed in the spaces therefor and when the correct answer to a problem has been completed even though not all of the character card spaces are filled.

According to one feature of the invention, the indicating or signalling devices may be operated electrically and the master and character cards carry conducting portions spaced according to keying formulas and which cooperate to energize the signals individually as the character cards are properly placed.

In a preferred construction the contacts which are engaged by such conducting portions are arranged in groups which are in series with each other so that the correct character cards must be placed successively in the correct order to energize the individual signals therefor.

It is also contemplated that the device may be provided with a multi-part casing with the master card being mounted on one part of the casing and with one or more additional parts being provided to receive the character cards so that the same problem may be solved remotely by several students. This is a highly desirable arrangement for class room instruction.

According to another feature of the invention the master card itself is provided with means for actuating the signals for the character card spaces not used in the solution of a problem. In an electrical type apparatus this means may take the form of a continuous conducting area to bridge the contacts of contact groups corresponding to the unused spaces. In mechanical type apparatus the means may take the form of signal actuating portions on the master card to engage and operate signal elements.

According to still another feature of the invention, the apparatus may be mechanical in form with the cards engaging and shifting mechanical indicating elements. In one preferred embodiment the mechanical indicating elements are flexible strips projecting into a sloping chute through which a ball tends to roll and which are retracted from the chute to permit rolling of the ball progressively past individual character card spaces as the correct character cards are placed in such spaces.

The above and other objects and features of the invention will be more readily apparent from the following description when read in connection with the accompanying drawings, in which:

FIG. 1 is a perspective view of one form of apparatus embodying the invention;

FIG. 2 is a view of a pair of different character cards used with the apparatus of FIG. 1;

FIG. 3 is a view of a master card used with the apparatus of FIG. 1;

FIG. 4 is a diagrammatic view showing the electrical circuits incorporated in the apparatus of FIG. 1 and the coaction of the master and character cards therewith;

FIG. 5 is a diagrammatic view illustrating a modification of the apparatus of FIG. 1;

FIG. 5a is a partial perspective view of still another modification of the apparatus of FIG. 1;

FIG. 6 is a perspective view of a mechanical form of educational device embodying the invention;

FIG. 7 is a view of two individual character cards for use with the apparatus of FIG. 6;

FIG. 8 is a view showing the cooperating key portions of the master and character cards as used with the apparatus of FIG. 6; and FIG. 9 is a sectional view through the apparatus of FIG. 6.

Referring first to FIGS. 1 to 4, the apparatus comprises a casing, indicated generally at 10, which is hollow and is of any desired size and shape, depending upon the preference of the user. The casing is provided with a flat portion 11 at one side thereof and with a separator strip 12 preferably spaced slightly above the upper surface of the casing. At the other side of the casing the flat upper surface is divided into a plurality of individual character card spaces 13 by spaced separator strips 14.

The larger area of the casing upper surface is adapted to receive a master card 15 which may be imprinted or may otherwise carry a designation of a problem to be solved. In the example shown, a simple problem in arithmetic is illustrated, although it will be understood that any other type of problem could be stated on the master card. As illustrated, the problem is broken down into five digits, the first being the numeral 5, the second being a plus sign, the third being the numeral 3, the fourth being an equal sign and the fifth being a question mark indicative of the problem to be solved. It will be noted that in this particular problem and with the apparatus as illustrated there are eight character card spaces 13, only five of which will be used in the completed solution of the stated problem.

The problem is solved by placing individual character cards, as indicated at 16 in FIG. 2, in the individual spaces 13. These cards may be positioned simply by sliding them into the spaces from the edge of the casing and co-operate according to the present invention with the master card and with indicating or signalling means in the casing to indicate when the stated problem has been correctly solved.

The apparatus as shown in FIG. 1 is electrical in character and includes circuits, as best shown in FIG. 4. In this construction the casing carries beneath the separating strip 12 a series of groups of contacts indicated generally at 17 and corresponding in number and spacing to the number and spacing of the character card spaces 13. Each group of contacts 17 comprises a series of spaced parallel conducting strips. The endmost contact strip of the endmost group is connected to one side of a source of power, such as a battery 18. The other side of the battery is connected to a common return lead 19 which is in turn connected to each of a series of signal lamps 21 corresponding in number and spacing to the character card spaces 13. In one desirable construction the character card spaces may be covered by translucent or transparent material, such as glass, so that when any one of the lamps is energized it will indicate that a correct character has been placed in the corresponding space. It will be apparent, of course, that the lamps 21 could be placed in any other desired location as, for example, opposite to the spaces on the separator strip 12 or that other types of signalling devices could be used.

Each signal lamp is separately connected to a special double contact member 22 which forms the end contact of one group 17 and the beginning contact of the next adjacent group. In this way, the several groups are connected in series with the endmost contact of the last group being connected through its signal lamp 21 to the common return lead 19.

In order to energize the several signal lamps, the master card is formed with a series of spaced conducting areas 23 which are spaced according to a keying formula. As shown, for example, the contacts 23 for the first unit of the problem consisting of the numeral 5 may include a relatively short conducting area and a longer conducting area spaced therefrom. Similarly, the conducting areas corresponding to the plus sign may include a pair of relatively long areas spaced in a different manner than those of the character 5. It will be understood that each different character to be used in the solution of the problems will have the conducting areas thereon spaced in a different manner so that each character is keyed individually according to a formula. Since the derivation of formulas for keying characteristics in this manner is well known and understood it will not be further illustrated herein.

The individual character cards are similarly formed with spaced conducting areas 24 which are complementary to the corresponding conducting areas on the master card. Thus the number and spacing of the conducting areas 24 is such that with respect to the number and spacing of the conducting areas 23 that when they are properly mated through the contact strips 17 a complete circuit will be made through an entire group of contact strips. This will be more readily apparent from FIG. 4 wherein it is seen that the first conducting area 24 on the character card bridges the first two contact strips, the first conducting area 23 on the master card bridges the next two conducting strips, the second conducting area 24 on the character card bridges the next two conducting strips, etc. to complete a circuit between the first contact of the first group 17 and the special double contact 22 to which the signal lamp for that group is connected.

In using the device as so far described to solve a problem, such as the problem in arithmetic illustrated, the master card may be inserted in the casing with its lower edge carrying the contact areas pressed beneath the separator strip 12 and with the contact areas making electrical contact with the contact strips 17. Individual character cards may then be inserted in the spaces 13 in an attempt to derive a solution to the problem. When the individual character card bearing the character 5 is inserted in the first space, a circuit will be completed through the first signal lamp 21 to indicate that the correct character card for that space has been placed. As the successive character cards are inserted in the spaces therefor the signal lamps 21 will be individually and successively energized so that the user is immediately informed when he has selected the correct character card for the solution of the problem. It will be noted that with the circuit as shown in FIG. 4 the character cards must be inserted in the correct order to illuminate their respective signals since insertion of, for example, the third character card in its space before the first and second character cards have been inserted, will not cause any energizing of the signal for the third space. This arrangement is, however, a matter of choice and it will be apparent that each of the spaces could be energized completely independently of the others.

So that the user may be informed when the complete solution of the problem has been arrived at, even though all of the individual character card spaces are not filled, provisions are made according to the present invention to actuate all of the signal devices even including those for the unused spaces when the solution is complete. For this purpose, the master card, as shown in FIGS. 1 to 4, carries at its right end an elongated continuous contact area 25 spanning the unused spaces. Thus when the master card is inserted in the apparatus the contact area 25 will completely bridge the contact groups for the last three spaces 13 which are not used in solution of the problem. Therefore, when the complete solution to the problem has been reached by insertion of the five character cards which are required for this purpose, all of the signal lamps 21 will be lighted and the operator will be informed that the solution to the problem is correct and complete.

For group instruction or entertainment the casing 10 may be separated into two or more parts, as may be shown in FIG. 5. There may be one part 10a corresponding to the upper part only of the casing, as shown in FIG. 1, to receive the master card and two or more parts 10b corresponding only to the lower part of the casing, as seen in FIG. 1, to provide the spaces 13. The contact strips 17 and 22 are either split or duplicated in each of the casing parts with the individual contact strips in the different casing parts being interconnected through conductors contained in cables, as indicated at 26. This apparatus is used in the same way as that of FIG. 1, except that a plurality of individual character card portions may be provided for simultaneous use in connection with the same master card. In this way, the apparatus is still adapted for group instruction or entertainment without requiring a separate complete unit for each user.

As shown in FIG. 5a, the master cards may be in the form of a continuous strip or tape instead of being individual cards as in FIGS. 1 to 4. In this construction, the casing 10 has a pair of rollers 27 rotatably mounted therein on parallel axes with handles 28 being attached to the rollers for turning them. A master card strip 15a is connected at its ends to the rollers to be wound thereon and forms a series of master card sections each of which states a problem to be solved.

The master card strip is trained over a guide roller 29 underlying the upper ends of the contact strips 17 and which supports the master card strip in engagement with the upper ends of the contact strips. The master card strip is formed at locations corresponding to the lower edges of the master card sections with contact areas 23a and 25a corresponding to the areas 23 and 25 of FIGS. 1 to 4.

This modification functions in the same manner as the structures previously described except that instead of changing individual master cards, the handles 28 are turned to move a desired master card section on the strip 15a into working position.

Instead of being electrical, as shown in FIGS. 1 to 5, the apparatus may be completely mechanical, as shown in FIG. 6. In this embodiment a hollow casing 30 is provided which is formed, as best seen in FIG. 9, with a vertical groove 31 intermediate its front and back edges into which a master card 32 may be inserted. The master card will be supported in a generally vertical position with its lower edge projecting into the guide slot or groove which may be cut away except at the ends of the casing to leave the lower edge of the master card exposed.

Forwardly of the guide groove 31 the casing provides a flat upper surface 33 which is separated by divider strips 34 into a plurality of individual character card spaces 35. The spaces 35 are adapted to receive individual character cards 36 which can be placed in the spaces and pushed rearwardly into position until their forward edges drop over a bead 37 at the front upper edge of the casing.

Indicating means for indicating proper placement of the character cards is provided in the form of a series of flexible strips 38 which may be formed of resilient metal or similar material. As shown, the strips 38 are securely anchored as by riveting 39 at one end within the casing and extend normally across the junction of the top surface 33 and guide means 31 through openings 41 in the front wall of the casing. The strips are normally resiliently biased to the position shown in full lines shown in FIG. 9 with their ends projecting out beyond the front wall of the casing, as shown.

In order to operate the indicator strips the master card is provided with a series of keying openings or slots 42 which are variably spaced and of variable lengths to correspond to keying formulas for the characters required for solution of the problem stated on the master card. Additionally, the master card is provided with a groove 43 corresponding to each character with the grooves being positioned to receive the indicator strips 38 for the individual spaces. Therefore, when the master card is inserted in the casing the indicator strips 38 will pass upwardly into the grooves 43 and will not be deflected.

Each of the character cards is provided with a series of keying projections 44 projecting from the end thereof and which correspond in number and spacing to the keying openings 42 in the master card. In this case, as in the case of FIGS. 1 to 5, the keying openings and keying projections are so correlated that only the keying projections on the correct character card can be inserted through the keying openings in the master card for correct solution to a problem. Additionally, each of the character cards is provided with a projection 45 at one side thereof to pass through one of the slots 43 in the master card and to engage the corresponding indicator strip 38.

In use of this apparatus, a master card stating a problem is inserted in the casing, as shown, and individual character cards conveying the answer to the problem may be inserted in the individual spaces 35 to solve the problem. In the example shown in the drawings, the devices used in teaching foreign language with the French word "homme" appearing on the master card and requiring insertion of the individual character cards spelling out the corresponding English word "man" for solution to the problem. As will be seen from FIG. 8, when the correct character cards are inserted the keying projections 44 thereon will register with and pass through the keying openings 42 in the master card thereby enabling the character cards to be fully inserted in the device. If an incorrect character card is attempted to be inserted the projections 44 thereon will fail to register with the corresponding keying openings 42 in the master card so that the character card cannot be inserted.

When the correct character card is inserted the projection 45 thereon will pass through the slot 43 in the master card and will engage the indicator strip 38 to flex it to the dotted line position shown in FIG. 8. This operation will withdraw the projecting end of the strip to a position substantially flush with the forward wall of the housing 30, a bent over hook portion 46 preferably being provided on the strip to prevent complete withdrawal thereof. Withdrawal of the projecting portion of the strip will indicate that the correct character card has been inserted in the space 35.

In this construction, as in FIGS. 1 to 5, complete solution of the problem is indicated regardless of the fact that character cards may not be placed in all of the spaces. For this purpose the master card is formed at one end thereof with an uninterrupted lower edge portion 47 from which slots 43 are omitted. Therefore when the master card is inserted in the device the edge portion 47 will engage the indicator strips 38 registering therewith and deflect them substantially to the dotted line position shown in FIG. 9 to retract the projecting ends thereof.

For more positive indication and to add interest to use of the device, the forward wall thereof may be provided with a chute down which a ball or marble 48 may roll. As shown, the chute is formed by a tapered block 49 secured to the forward wall of the casing with an L-shaped cover of transparent material 51 secured thereover to form therewith a passage for the ball. When a problem is set up the ball may be inserted in the upper left end of the chute and will be held against rolling down the chute by the projecting end portions of the indicator strips 38. As the correct character cards are placed the projecting end portions of the indicator strips corresponding thereto will be retracted and the ball will be permitted to roll past the space in which a correct character card is placed. When the complete correct solution to the problem has been reached, all of the projecting end portions of the indicator strips will be retracted and the ball may roll completely through the chute to be caught in a box or the like, as shown at 52.

While several embodiments of the invention have been shown and described herein it will be understood that they are illustrative only and not to be taken as a definition of the scope of the invention, reference being had for this purpose to the appended claims.

What is claimed is:

1. An educational device comprising a housing, means on the housing to receive a master card, means on the housing defining a plurality of spaces on the housing to receive individual character cards, an indicating device for each of the spaces normally occupying a first position but movable to a second position, a master card to be received in said first named means, a plurality of individual character cards to be received in said spaces, the master card being formed with spaced keying openings and the character cards being formed with complementary keying projections at one edge thereof normally to engage the master card and block full insertion of the character cards into the space but entering the keying openings to permit such insertion when the correct character card for a given space is inserted in that space, and a projection on each of the character cards operative when the character card is fully inserted into a space to move the indicating device for that space from its first to its second position and means on the master card to move certain of the indicating devices for which there are no corresponding character cards in the solution of a problem from their first to their second positions.

2. The educational device of claim 1 in which the indicating devices include portions projecting beyond a wall of the housing in their first position and which are retracted in their second position and a downwardly sloping guide chute is provided adjacent to said wall of the housing to receive a ball which is stopped by the projecting portions of the indicating devices.

3. An educational device comprising a housing, means on the housing to receive a master card, a plurality of spaces on the housing to receive individual character cards, a flexible indicating strip for each of the spaces secured at one end in the housing and projecting at its other end through a wall of the housing, the projecting end of the strip being shifted when the strip is flexed, a master card to be received in said means, a plurality of individual character cards to be received in said spaces, the master card being formed with keyed openings therein registering with each of the spaces and the character cards being formed with complementary projections thereon which can extend through the openings when the character cards are properly matched with the master card, a projection on each character card engaging and flexing the indicating strip for the space in which that character card is mounted.

4. The educational device of claim 3 in which the master card includes a portion engaging and flexing certain of the indicating strips for spaces for which there are no character cards in the solution of a problem.

5. The educational device of claim 3 including a downwardly inclined guide chute on the housing into which the flexible indicating strips normally project, and a ball in the chute which engages and is restrained by the projecting indicating strips.

6. An educational device comprising a housing, a pair of spaced rollers in the housing adapted to receive a flexible tape to be transferred by winding from one of the rollers to the other, the tape being formed with spaced master card sections and having thereon adjacent to each such section keying means corresponding to individual characters complementary to such section, means defining a plurality of spaces on the housing to receive individual character cards, a plurality of individual character cards to be received individually in said spaces and each having thereon keying means complementary respectively to different keying means on the tape, and indicating means controlled jointly by the keying means on the tape and on the character cards and which is actuated when the correct character cards corresponding to an effective master card section of the tape are placed in the spaces.

7. The device of claim 6 in which the keying means on the tape and the character cards are spaced electrically conductive areas and the housing carries spaced electrical contacts selectively engageable with said areas.

8. An educational device comprising a first housing section having means thereon to receive a master card, a master card to be received in said means and formed with spaced electrically conductive areas keyed to correspond to different characters on the master card, a plurality of electrical contacts on the housing section selectively engageable with said areas in different combinations, a plurality of second housing sections each formed with a plurality of spaces to receive individual character cards, a plurality of character cards to be received selectively in said spaces and each formed with electrically conductive areas keyed to the character on such card, a plurality of electrical contacts on each of said second housing sections selectively engageable with said areas on the character cards, conductors connecting the contacts on the first housing section individually to complementary contacts on each of the second housing sections, and indicating means connected to certain of the contacts to be energized when character cards corresponding to characters on the master card are placed in said spaces.

9. The device of claim 8 in which the indicating means comprises an electrical signal in each of the second housing sections for each of the spaces therein and which are so connected as to be energized successively as the correct character cards are placed successively in the spaces in such second housing section.

References Cited by the Examiner

UNITED STATES PATENTS 2,612,708   10/1952   Amsel _____ 35—35.4
3,146,534   9/1964   Brown et al. _____ 35—9

EUGENE R. CAPOZIO, *Primary Examiner.*

W. W. NIELSEN, R. E. KLEIN, *Assistant Examiners.*